US011223925B2

(12) United States Patent
Laaksonen et al.

(10) Patent No.: US 11,223,925 B2
(45) Date of Patent: Jan. 11, 2022

(54) APPARATUS AND ASSOCIATED METHODS FOR PRESENTATION OF CAPTURED SPATIAL AUDIO CONTENT

(71) Applicant: Nokia Technologies Oy, Espoo (FI)

(72) Inventors: Lasse Laaksonen, Tampere (FI); Arto Lehtiniemi, Lempaala (FI); Toni Mäkinen, Pirkkala (FI); Mikko Heikkinen, Tampere (FI)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 16/772,469

(22) PCT Filed: Dec. 11, 2018

(86) PCT No.: PCT/EP2018/084321
§ 371 (c)(1),
(2) Date: Jun. 12, 2020

(87) PCT Pub. No.: WO2019/121150
PCT Pub. Date: Jun. 27, 2019

(65) Prior Publication Data
US 2020/0389755 A1    Dec. 10, 2020

(30) Foreign Application Priority Data

Dec. 22, 2017    (EP) .................................... 17209901

(51) Int. Cl.
*H04S 7/00*    (2006.01)
*G06F 3/16*    (2006.01)
(Continued)

(52) U.S. Cl.
CPC .............. *H04S 7/304* (2013.01); *G06F 3/165* (2013.01); *G11B 27/11* (2013.01); *G11B 27/32* (2013.01);
(Continued)

(58) Field of Classification Search
CPC .. H04S 7/304; H04S 2400/11; H04S 2400/15; H04S 2420/01; G06F 3/165; G11B 27/11; G11B 27/32
See application file for complete search history.

(56) References Cited

U.S. PATENT DOCUMENTS 7,559,026 B2    7/2009    Girish et al.
8,854,447 B2    10/2014    Conness et al.
(Continued)

FOREIGN PATENT DOCUMENTS

CN    101999067 A    3/2011
CN    103493513 A    1/2014
(Continued)

OTHER PUBLICATIONS

Extended European Search Report received for corresponding European Patent No. 17209901.2, dated Jul. 10, 2018, 7 pages.
(Continued)

*Primary Examiner* — Fan S Tsang
*Assistant Examiner* — David Siegel
(74) *Attorney, Agent, or Firm* — Harrington & Smith (57) ABSTRACT

An apparatus configured to: based on (i) captured spatial audio content of a scene comprising audio that is associated with information indicative of at least a direction in the scene from which said audio was captured; and (ii) visual focus information comprising information indicative of at least a first part of the scene on which corresponding captured visual imagery of the scene is focused for presentation to a user; provide for presentation of the captured spatial audio content to accompany the captured visual imagery, the captured spatial audio content presented as spatial audio, the spatial audio content provided for presentation with a spatial audio focus selectively applied to audio captured from a second part of the scene different to the first
(Continued)

part, the spatial audio focus comprising an audio-modifying effect to increase the audibility of the audio having a direction corresponding to the second part.

20 Claims, 4 Drawing Sheets

(51) Int. Cl.
*G11B 27/11* (2006.01)
*G11B 27/32* (2006.01)

(52) U.S. Cl.
CPC ....... *H04S 2400/11* (2013.01); *H04S 2400/15* (2013.01); *H04S 2420/01* (2013.01)

(56) References Cited

U.S. PATENT DOCUMENTS

| | | | |
|---|---|---|---|
| 9,299,353 | B2 | 3/2016 | Sole et al. |
| 9,367,939 | B2 | 6/2016 | Eronen et al. |
| 2010/0169103 | A1* | 7/2010 | Pulkki .................. H04S 7/302 704/500 |
| 2014/0129937 | A1* | 5/2014 | Jarvinen ................ G08C 17/02 715/716 |
| 2015/0054943 | A1 | 2/2015 | Zad Issa et al. |
| 2016/0080684 | A1* | 3/2016 | Farrell ................. H04N 9/8211 386/227 |
| 2016/0088417 | A1 | 3/2016 | Kim et al. |
| 2016/0269712 | A1 | 9/2016 | Ostrover et al. |
| 2017/0040028 | A1 | 2/2017 | Seligmann et al. |
| 2019/0174246 | A1* | 6/2019 | De Bruijn ............... H04S 7/302 |

FOREIGN PATENT DOCUMENTS

| | | |
|---|---|---|
| CN | 106954121 A | 7/2017 |
| EP | 3036913 A1 | 6/2016 |
| EP | 3112992 A1 | 1/2017 |
| EP | 3174005 A1 | 5/2017 |
| EP | 3236 345 A1 | 10/2017 |
| JP | 2015193710 A | 11/2015 |
| JP | 2017201743 A | 11/2017 |
| JP | 2019521440 A | 7/2019 |
| WO | 2017/045077 A1 | 3/2017 |

OTHER PUBLICATIONS

International Search Report and Written Opinion received for corresponding Patent Cooperation Treaty Application No. PCT/EP2018/084321, dated Feb. 20, 2019, 10 pages.
Office action received for corresponding Chinese Patent Application No. 201880083288.X, dated Mar. 1, 2021, 10 pages of office action and 6 pages of Translation available.

* cited by examiner

| 700 | based on<br>(i) captured spatial audio content of a scene comprising audio that is associated with information indicative of at least a direction in the scene from which said audio was captured; and (ii) visual focus information comprising information indicative of at least a first part of the scene on which corresponding captured visual imagery of the scene is focussed for presentation to a user; |
|---|---|
| 701 | providing for presentation of the captured spatial audio content to accompany the presentation of the captured visual imagery, the captured spatial audio content presented as spatial audio configured to provide the perception, for the user, of the audio originating from the directions indicated in the captured spatial audio content, the spatial audio content provided for presentation with a spatial audio focus selectively applied to audio captured from a second part of the scene different to the first part, the spatial audio focus comprising an audio-modifying effect to increase the audibility of the audio having a direction corresponding to the second part relative to the audio from elsewhere in the scene. |

Figure 8

APPARATUS AND ASSOCIATED METHODS FOR PRESENTATION OF CAPTURED SPATIAL AUDIO CONTENT

RELATED APPLICATION

This application claims priority to PCT Application No. PCT/EP2018/084321, filed on Dec. 11, 2018, which claims priority to EP Application No. 17209901.2, filed on Dec. 22, 2017, each of which is incorporated herein by reference in its entirety.

TECHNICAL FIELD

The present disclosure relates to the field of presentation of spatial audio content. In particular, it is related to the presentation of spatial audio content with a focus on part of the spatial audio content, associated apparatus, methods and computer programs.

BACKGROUND

The presentation of spatial audio content provides a rich experience for a user. However, the rich experience may make the presentation of such content overwhelming or difficult to understand. Accordingly, providing for presentation of spatial audio content in an effective way may be difficult.

The listing or discussion of a prior-published document or any background in this specification should not necessarily be taken as an acknowledgement that the document or background is part of the state of the art or is common general knowledge. One or more aspects/examples of the present disclosure may or may not address one or more of the background issues.

SUMMARY

In a first example aspect there is provided an apparatus, the apparatus comprising means configured to:
based on
(i) captured spatial audio content of a scene comprising audio that is associated with information indicative of at least a direction in the scene from which said audio was captured; and
(ii) visual focus information comprising information indicative of at least a first part of the scene on which corresponding captured visual imagery of the scene is focused for presentation to a user;
provide for presentation of the captured spatial audio content to accompany the presentation of the captured visual imagery, the captured spatial audio content presented as spatial audio configured to provide the perception, for the user, of the audio originating from the directions indicated in the captured spatial audio content, the spatial audio content provided for presentation with a spatial audio focus selectively applied to audio captured from a second part of the scene different to the first part, the spatial audio focus comprising an audio-modifying effect to increase the audibility of the audio having a direction corresponding to the second part relative to the audio from elsewhere in the scene.

In one or more examples, the second part is selected by the apparatus based on audio focus information that is specific to the user to which the captured visual imagery and captured spatial audio content is intended for presentation and the apparatus comprises means configured to determine the audio focus information based on at least one of:
a) a user-selection, from the user, of the at least one part of the scene;
b) user-set profile setting indicative of one or more of audio or sources of audio preferred by the user;
b) historical data associated with the user and indicative of one or more user-selections, by the user, of common features that are audibly present in the captured spatial audio content or visually appear in the captured visual content as well as in different, captured visual and audio content that has been previously presented to the user and selected by the user;
c) historical location data associated with the user and indicative of common features that are audibly present in the captured spatial audio content or visually appear in the captured visual content as well as in different, captured visual and audio content that has been previously presented to the user at a location corresponding to a determined location of the scene;
d) time specific data comprising historical data indicative of audio that is common to the captured spatial audio content as well as in different, captured visual and audio content captured at a related time period, comprising a recent time period or a corresponding time of day or year.

In one or more examples, the apparatus has means, in the provision for presentation of the captured spatial audio content, configured to mix the captured spatial audio content with different captured spatial audio content that is related to the captured spatial audio content based on one or both of the time it was captured and the location at which it was captured, the spatial audio focus applied to a second part of the mixed, different captured spatial audio content.

In one or more examples, the first part of the scene comprises at least one of:
a) the whole spatial extent of the captured visual content that is currently provided for presentation;
b) a sub-section of the whole spatial extent of the captured visual content that is currently provided for presentation;
c) a part of the captured visual content that is currently provided for presentation and has been selected by the user.

In one or more examples, the captured visual content and captured spatial audio content is provided for presentation live and the provision of the captured spatial audio content for presentation with the spatial audio focus selectively applied provides for sending of feedback signalling to a content capture device capturing the captured spatial audio content, the feedback signalling configured to provide for application of the audio-modifying effect by the content capture device.

In one or more examples, the captured visual content and captured spatial audio content is pre-recorded captured content, the captured visual content captured in an optical refocusable format that enables a change in the optical focus in terms of one or both of the position and depth of the depth of field of the visual imagery in accordance with the visual focus information.

In one or more examples, the apparatus, based on the captured visual imagery of the scene, is configured to provide for presentation of the captured visual imagery with the first part of the scene defined in the visual focus information focused for presentation to the user.

In one or more examples, the first part of the scene is focused for presentation in terms of at least one of:
  i) the first part comprises a spatial sub-section of the scene that is within a view provided for presentation; and
  ii) the first part comprises a spatial sub-section of a view provided for presentation that is in optical focus relative to a remainder of the view provided for display that is less in optical focus.

In one or more examples, the captured visual imagery of the scene comprises one of:
  a) a still visual image of the scene;
  b) video imagery of the scene;
  c) virtual reality imagery of the scene having a spatial extent greater than a spatial extent presentable to the user at any one time.

In one or more examples, the apparatus has means configured to perform the following: based on (i) a change in the visual focus information to define at least a third part of the scene on which the captured visual imagery provided for presentation to a user should be focused and (ii) the on-going presentation of the captured spatial audio content to accompany the presentation of the captured visual imagery;
  provide for a change in the selectively applied spatial audio focus to audio captured from a fourth part of the scene different to the second part.

In one or more examples, the apparatus has means configured to perform the following: based on (i) analysis of the captured spatial audio content being indicative of one or both of a change in sources of audio in the scene and a change in the position of sources of audio in the scene and (ii) the on-going presentation of the captured spatial audio content to accompany the presentation of the captured visual imagery;
  provide for a change in the selectively applied spatial audio focus to audio captured from a fourth part of the scene different to the first part and the second part.

In one or more examples, the captured visual content and captured spatial audio content is provided for presentation live and the apparatus comprises means configured to determine one or more candidate second parts of the scene based on computer-implemented analysis of the captured spatial audio content as it is captured, the apparatus configured to select one or more of said candidate second parts for application of said spatial audio focus.

In one or more examples, the captured visual content and the captured spatial audio content is pre-recorded content and the apparatus comprises means configured to determine one or more candidate second parts of the scene based on computer-implemented analysis of the captured spatial audio content prior, at least in part, to the provision of the captured spatial audio content for presentation, the apparatus configured to select one or more of said candidate second parts for application of said spatial audio focus.

In one or more examples, the audio provided with the spatial audio focus is further presented with a user-selectable link, wherein the apparatus has means configured, on user selection of the link, to provide for presentation of different captured visual imagery and corresponding captured visual imagery, the different captured visual imagery and corresponding captured visual imagery having one or more of (i) captured spatial audio content that is determined to be audibly similar based on audio analysis in comparison to the audio provided with the spatial audio focus and (ii) captured visual imagery that is determined to contain imagery of an audio source that is related to a determined source of the audio provided with the spatial audio focus.

In one or more examples, the audio focus information is determined using a neural network based on a plurality of instances of spatial audio content presented to the user.

In a second example aspect there is provided a method, the method comprising:
  based on
    (i) captured spatial audio content of a scene comprising audio that is associated with information indicative of at least a direction in the scene from which said audio was captured; and
    (ii) visual focus information comprising information indicative of at least a first part of the scene on which corresponding captured visual imagery of the scene is focused for presentation to a user;
  providing for presentation of the captured spatial audio content to accompany the presentation of the captured visual imagery, the captured spatial audio content presented as spatial audio configured to provide the perception, for the user, of the audio originating from the directions indicated in the captured spatial audio content, the spatial audio content provided for presentation with a spatial audio focus selectively applied to audio captured from a second part of the scene different to the first part, the spatial audio focus comprising an audio-modifying effect to increase the audibility of the audio having a direction corresponding to the second part relative to the audio from elsewhere in the scene.

In a third example aspect there is provided a computer readable medium comprising computer program code stored thereon, the computer readable medium and computer program code being configured to, when run on at least one processor, perform the method of:
  based on
    (i) captured spatial audio content of a scene comprising audio that is associated with information indicative of at least a direction in the scene from which said audio was captured; and
    (ii) visual focus information comprising information indicative of at least a first part of the scene on which corresponding captured visual imagery of the scene is focused for presentation to a user;
  providing for presentation of the captured spatial audio content to accompany the presentation of the captured visual imagery, the captured spatial audio content presented as spatial audio configured to provide the perception, for the user, of the audio originating from the directions indicated in the captured spatial audio content, the spatial audio content provided for presentation with a spatial audio focus selectively applied to audio captured from a second part of the scene different to the first part, the spatial audio focus comprising an audio-modifying effect to increase the audibility of the audio having a direction corresponding to the second part relative to the audio from elsewhere in the scene.

In a fourth example aspect there is provided an apparatus comprising:
  at least one processor; and
  at least one memory including computer program code,
  the at least one memory and the computer program code configured to, with the at least one processor, cause the apparatus to perform at least the following:
  based on
    (i) captured spatial audio content of a scene comprising audio that is associated with information indicative of at least a direction in the scene from which said audio was captured; and
    (ii) visual focus information comprising information indicative of at least a first part of the scene on which corresponding captured visual imagery of the scene is focused for presentation to a user;

provide for presentation of the captured spatial audio content to accompany the presentation of the captured visual imagery, the captured spatial audio content presented as spatial audio configured to provide the perception, for the user, of the audio originating from the directions indicated in the captured spatial audio content, the spatial audio content provided for presentation with a spatial audio focus selectively applied to audio captured from a second part of the scene different to the first part, the spatial audio focus comprising an audio-modifying effect to increase the audibility of the audio having a direction corresponding to the second part relative to the audio from elsewhere in the scene.

The present disclosure includes one or more corresponding aspects, examples or features in isolation or in various combinations whether or not specifically stated (including claimed) in that combination or in isolation. Corresponding means and corresponding functional units (e.g., function enabler, ARNR graphic renderer, display device) for performing one or more of the discussed functions are also within the present disclosure.

Corresponding computer programs for implementing one or more of the methods disclosed are also within the present disclosure and encompassed by one or more of the described examples.

The above summary is intended to be merely exemplary and non-limiting.

BRIEF DESCRIPTION OF THE FIGURES

A description is now given, by way of example only, with reference to the accompanying drawings, in which.

DESCRIPTION OF EXAMPLE ASPECTS

Figure 1:
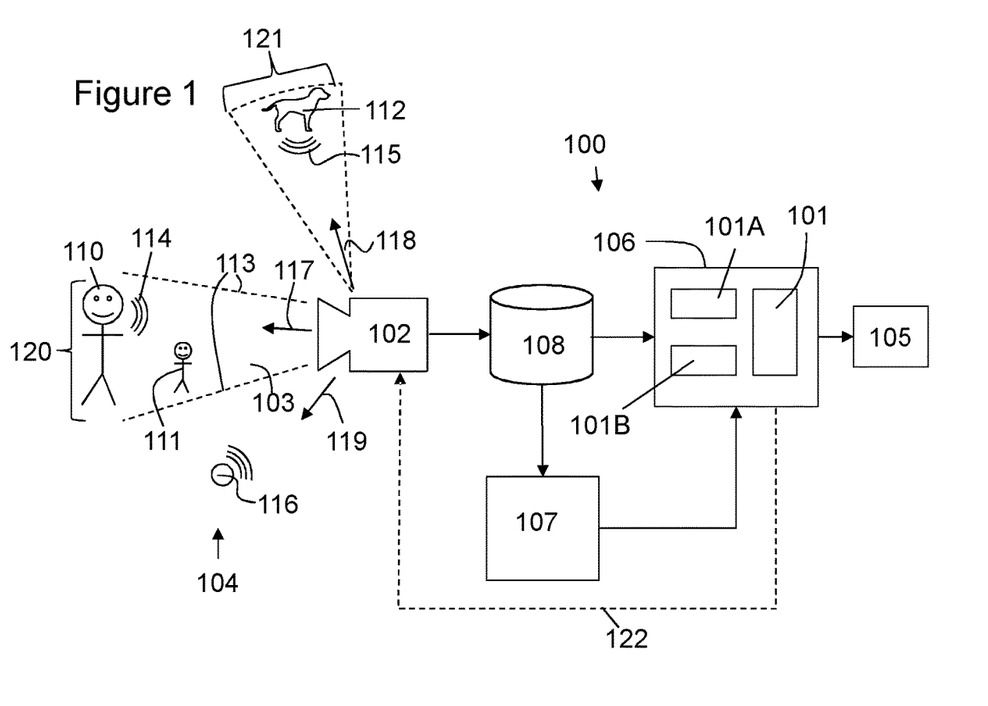
FIG. 1 illustrates an example apparatus for providing for presentation of captured spatial audio content and visual imagery of a scene captured by a content capture device.

With reference to FIG. 1, a system 100 and, in particular, an apparatus 101 provides for the presentation of captured spatial audio content. In one or more examples, the apparatus 101 provides for the presentation of audio-visual content in the form of captured visual imagery and the captured spatial audio content. The spatial audio content is captured in a form such that the spatial arrangement of sources of audio in a scene is captured to audibly provide for the recreation of the scene on playback of the spatial audio content. The captured spatial audio content may be presented such that a user perceives the audio presented to them as originating from specific directions and/or locations corresponding to the spatial arrangement in the scene. Accordingly, the captured spatial audio content can be considered to provide a virtual audio scene that may replicate a real-world scene with sources of audio arranged around a capture device or may comprise a computer-generated scene.

As mentioned, spatial audio comprises audio presented in such a way to a user that it is perceived to originate from a particular location, as if the one or more sources of the audio were located at a particular, respective, location. Spatial audio may be presented without accompanying visual imagery or with still or moving visual imagery (e.g. a picture or video).

Virtual reality content may be provided with spatial audio, such that the audio is perceived to originate from one or more points in a virtual reality (VR) space, which may be linked to the imagery of the VR content. Augmented or mixed reality content may be provided with spatial audio, such that the spatial audio is perceived as originating from real world objects visible to the user and/or from augmented reality graphics overlaid over the user's view.

The spatial positioning of the spatial audio, to generate the "virtual audio scene", may be provided by 3D audio effects, such as those that utilise a head related transfer function to create a spatial audio space in which audio can be positioned for presentation to a user. Spatial audio may be presented by headphones by using head-related-transfer-function (HRTF) filtering techniques or, for loudspeakers, by using vector-base-amplitude panning techniques (VBAP) to position the perceived aural origin(s) of the audio content. In other embodiments ambisonic audio presentation may be used to present spatial audio. Spatial audio may use one or more of volume differences, timing differences, and pitch differences between audible presentation to each of a user's ears to create the perception that the origin of the audio is at a particular location in space. The perceived distance to the origin of the audio may be rendered by controlling the amount of reverberation, control of the frequency content and gain to indicate closeness or distance from the perceived source of the spatial audio.

A content capture device 102 may be used to capture visual imagery of at least a spatial part 103 of a scene 104 as well as omnidirectional audio content from the scene 104. The content capture device 102 may comprise a still image camera having, or associated with, spatial audio capture capability. The content capture device 102 may comprise a video camera having, or associated with, spatial audio capture capability. The content capture device 102 may comprise a camera, or smart phone comprise a camera, for capture of moving or still images and having or associated with spatial audio capture capability. In one or more examples, the content capture device comprises a virtual reality content capture device, which will be described below.

Virtual reality (VR) may use a VR display comprising a headset, such as glasses or goggles or virtual retinal display, or one or more display screens that surround a user to provide the user with an immersive virtual experience. A virtual reality apparatus, which may or may not include the VR display, may provide for presentation of multimedia VR content representative of a virtual reality scene to a user to simulate the user being present within the virtual reality scene. Accordingly, in one or more examples, the VR apparatus may provide signalling to a VR display for display of the VR content to a user while in one or more other examples, the VR apparatus may be part of the VR display, e.g. part of the headset. The virtual reality scene may therefore comprise the VR content displayed within a three-dimensional virtual reality space so that the user feels immersed in the scene, as if they were there, and may look around the VR space at the VR content displayed around them. The virtual reality scene may replicate a real-world scene to simulate the user being physically present at a real-world location or the virtual reality scene may be computer generated or a combination of computer generated and real-world multimedia content. Thus, the VR content may be considered to comprise the imagery (e.g. static or video imagery), audio and/or accompanying data from which a virtual reality scene may be generated for display. The VR apparatus may therefore provide the VR scene by generating the virtual, three-dimensional, VR space in which to display the VR content. The virtual reality scene may be provided by a panoramic video (such as a panoramic live broadcast), comprising a video having a wide or 360° field of view (or more, such as above and/or below a horizontally oriented field of view, e.g. 360° by 180°). A panoramic video may have a wide field of view in that it has a spatial extent greater than a field of view of a user or greater than a field of view with which the panoramic video is intended to be displayed.

The VR content provided for presentation to the user may comprise live or recorded images of the real world, captured by a VR content capture device, for example. An example VR content capture device comprises a Nokia Technologies OZO device. As the VR scene is typically larger than a portion a user can view with the VR display, the VR apparatus may provide, for display on the VR display, a virtual reality view of the VR scene to a user, the VR view showing only a spatial portion of the VR content that is viewable at any one time. The VR apparatus may provide for panning around of the VR view in the VR scene based on movement of a user's head and/or eyes. A VR content capture device may be configured to capture VR content for display to one or more users. A VR content capture device may comprise one or more cameras and, optionally, one or more (e.g. directional) microphones or a microphone array configured to capture the surrounding visual and aural scene from a capture point of view. In some examples, the VR content capture device comprises multiple, physically separate cameras and/or microphones. Thus, a musical performance may be captured (and recorded) using a VR content capture device, which may be placed on stage, with the performers moving around it or from the point of view of an audience member. In each case a consumer of the VR content may be able to look around using the VR display of the VR apparatus to experience the performance at the capture location as if they were present.

Augmented reality (AR) may use an AR display, such as glasses or goggles or a virtual retinal display, to augment a view of the real world (such as seen through the glasses or goggles) with computer generated content (which may be electronically created or cropped or otherwise extracted from captured content). An augmented reality apparatus, which may or may not include an AR display, may provide for presentation of multimedia AR content configured to be overlaid over the user's view of the real-world. Thus, a user of augmented reality may be able to view the real world environment around them, which is augmented or supplemented with content provided by the augmented reality apparatus, which may be overlaid on their view of the real world and/or aurally overlaid over an aural real world scene they can hear. The content may comprise multimedia content such as pictures, photographs, video, diagrams, textual information, aural content among others. Thus, while augmented reality may provide for direct viewing of the real world with the addition of computer generated graphics and/or audio content, a user of virtual reality may only be able to see content presented on the VR display of the virtual reality apparatus substantially without direct viewing of the real world.

The virtual reality content may comprise, and a VR apparatus presenting said VR content may provide, predefined-viewing-location VR or free-viewing-location VR. In predefined-viewing-location VR, the location of the user in the virtual reality space may be fixed or follow a predefined path. Accordingly, a user may be free to change their viewing direction with respect to the virtual reality imagery provided for display around them in the virtual reality space, but they may not be free to arbitrarily change their viewing location in the VR space to explore the VR space. Thus, the user may experience such VR content from a fixed point of view or viewing location (or a limited number of locations based on where the VR content capture devices were located in the scene). In some examples of predefined-viewing-location VR the imagery may be considered to move past them. In predefined-viewing-location VR content captured of the real world, the user may be provided with the point of view of the VR content capture device. Predefined-viewing-location VR content may provide the user with three degrees of freedom in the VR space comprising rotation of the viewing direction around any one of x, y and z axes and may therefore be known as three degrees of freedom VR (3DoF VR).

Embodiments of the example apparatus described herein may comprise VR or AR apparatuses. The AR or VR content may be of predefined-viewing-location type or of free-viewing-location type. In many examples, AR can be considered predominantly free-viewing-location type, particularly when content is mapped to real-world geometry.

In one or more examples, when presenting audio as spatial audio the experience can be very rich and overwhelming given the immersive nature of spatial audio, especially if accompanied by visual content such as VR content. In one or more examples, it may be difficult for a user to understand the scene 102 from spatial audio presentation of the captured audio and presentation of the visual imagery. In one or more examples, it may be difficult for a user to quickly identify the most relevant content in the scene and thus, for example, to decide whether to continue exploring the scene or to end presentation of the content and perhaps switch to a different scene. The apparatus 101 may provide for presentation of the captured spatial audio content in a way to improve the experience for a user and, in at least some examples, assist in understanding the scene and the various audio and visual content provided therein. Thus, in one or more examples, it may be difficult to effectively present spatial audio content. In the real-world, a user may be more aware of their surroundings and therefore may understand the scene they are in. However, when presenting spatial audio and visual imagery, that may simulate a real-world location or comprise a computer-generated location, there may be less understanding and thus the way in which the content is presented provides a technical challenge to ensure the consumer of the content understands the context of what they are being presented with. As a further example, the presentation of augmented reality in which real-world and augmented stimuli are present can be confusing and therefore effective presentation of the augmented reality content may be advantageous.

The example system 100 of FIG. 1 shows the apparatus 101 for providing for the presentation of captured spatial audio content by a presentation device, which may at least comprise headphones 105 or other form of audio presentation equipment, such as speakers. The apparatus 101 may comprise part of a computing apparatus 106 such as a mobile telephone, smart phone, smart watch, laptop computer, tablet computer or wearable device among others. In this example, the processor 101A and memory 101B is shared by the computing apparatus 106 and the apparatus 101, but in other examples, they may have their own processors and/or memory.

The apparatus 101 may comprise or be connected to a processor 101A and a memory 101B and may be configured to execute computer program code. The apparatus 101 may have only one processor 101A and one memory 101B but it will be appreciated that other embodiments may utilise more than one processor and/or more than one memory (e.g. same or different processor/memory types). Further, the apparatus 101 may be an Application Specific Integrated Circuit (ASIC).

The processor may be a general purpose processor dedicated to executing/processing information received from other components, such as from an audio focus determination apparatus 107 and a content store 108, in accordance with instructions stored in the form of computer program code in the memory. The output signalling generated by such operations of the processor is provided onwards to further components, such as to the presentation device 105.

The memory 101B (not necessarily a single memory unit) is a computer readable medium (solid state memory in this example, but may be other types of memory such as a hard drive, ROM, RAM, Flash or the like) that stores computer program code. This computer program code stores instructions that are executable by the processor, when the program code is run on the processor. The internal connections between the memory and the processor can be understood to, in one or more example embodiments, provide an active coupling between the processor and the memory to allow the processor to access the computer program code stored on the memory.

In this example, the respective processors and memories are electrically connected to one another internally to allow for electrical communication between the respective components. In this example, the components are all located proximate to one another so as to be formed together as an ASIC, in other words, so as to be integrated together as a single chip/circuit that can be installed into an electronic device. In some examples one or more or all of the components may be located separately from one another.

The apparatus 101, or the computing apparatus 106 under the control of the apparatus 101, may provide for presentation of captured spatial audio content and, optionally, captured visual imagery. In one or more examples, the apparatus 101 may be configured to provide for presentation of the captured spatial audio content and not the captured visual imagery. The visual imagery content may be provided for display by a different apparatus, such as the apparatus 106. However, in other embodiments the apparatus 101 or a combination of apparatuses 101 and 106 may provide for presentation of both the captured visual imagery and captured spatial audio content. In one or more examples, the presentation device 105 comprises a display and headphones and, in other examples, the presentation device comprises a VR headset.

The apparatus 101 may receive signalling representative of captured spatial audio content from the store 108, which may have been captured by one or more content capture devices 102. As mentioned above, the capture device 102 may comprise a VR content capture device such as a Nokia OZO camera. The capture device 102 may be configured to capture at least spatial audio content of a scene in which it is located. In one or more examples, the content capture device 102 is configured to capture visual imagery of the scene 104 and spatial audio content.

The apparatus 101 may be configured to provide for presentation of live (e.g. at the time of the event being captured) or pre-recorded spatial audio content (e.g. after the time of the event captured). Thus, in the case of pre-recorded content, the store 108 may be representative of a physical storage device or a remote server to which the apparatus 101 has access that includes a copy of the captured spatial audio content. In the case of live content, the store 108 may represent a buffer or transient storage of the captured spatial audio content before it is presented to a user. Further, the system 100, comprising the content captured device 102, store 108, and apparatuses 106, 108, may comprise a single device and therefore, the capture and presentation of the scene may be provided by the same apparatus. In other examples, the content capture device 102 may be separate from the apparatuses 101, 106, and may transfer the captured spatial audio content and visual imagery to the store 108 for access by one or more other apparatuses 101. While the system 100 shows both capture of the content and apparatus 101, 106, 105 for presenting the content, this may be just for appreciation of the whole system and capture and storage of content may be performed remotely from the presentation of the captured content.

The example scene 104 comprises a father 110 and son 111 and a pet dog 112. The content capture device 102, as represented by dashed lines 113 representing the field of view of the captured visual imagery, is capturing or has captured visual imagery of the father and son 110, 111, while the dog 112 is outside the field of view 113. It will be appreciated that the field of view 113 may represent the spatial extent of what is captured and available for viewing in the captured visual content, but in other examples the spatial extent of what is captured may be greater than what is presented to a user at any one time. The scene 104 includes a plurality of sources of audio comprising the father shouting 114, the dog barking 115 and a further source of audio 116. The captured audio therefore has directions 117, 118, 119 or locations in the scene 104, which are captured by the capture device 102. Thus, in one or more examples, directional microphones or a microphone array may be used to distinguish audio from different directions. In one or more examples, the audio may be received from location tracked close-up microphones associated with each audio source, such as in a television production embodiment. In one or more examples, the way the audio is captured, such as ambisonic audio capture or other relevant multi-microphone configuration and capture processing, inherently provides for recreation of the spatial arrangement of the sources of audio.

The apparatus 101 in one or more examples may be configured to provide for presentation of the captured spatial audio content to accompany the presentation of the captured visual imagery, which may also be provided for presentation by the apparatus 101 or by apparatus 106 for example. The apparatus 101 may provide for said presentation based on the following received information:

(i) the captured spatial audio content;
(ii) visual focus information; and, optionally,
(iii) audio focus information.

The captured spatial audio content of the scene 104 may comprise audio captured from the audio sources 114, 115, 116 in the scene 104 that is associated with information indicative of at least a direction 117, 118, 119 in the scene 104 from which said audio was captured. In one or more examples the audio captured may be associated with information indicative of the location in the scene 104, such as relative to the location of the content capture device 102. The captured spatial audio content may comprise computer-generated content.

The presentation of the captured visual imagery may be provided with a focus. A focus may, in one or more examples, comprise the current field of view 113 of the captured visual imagery and may therefore comprise the focus relative to the scene 104. Thus, the part of the visual imagery having the focus may comprise that visual imagery that is currently provided for presentation to a user. In one or more examples, the captured visual imagery may have a spatial extent greater than the spatial extent of what is provided for presentation to a user, and therefore the focus may comprise the spatial sub-section of the whole spatial extent of the captured visual content that is currently provided for presentation. In one or more examples, the focus may comprise a spatial sub-section of the whole spatial extent of the visual imagery or of what is currently presented to the user or that has been selected by the user. The spatial sub-section may have a visual effect applied thereto to distinguish it over the remaining visual imagery provided for presentation to a user. Thus, in summary, the focus comprises a view of the visual imagery of the scene or a part thereof that is given focus, by way of a visual difference, over a remaining part of what is presented to the user.

The visual focus information provided to the apparatus 101 may inform the apparatus 101 of at least a first part 120 of the scene 104, as represented in captured visual imagery, or of a spatial sub-section of what is provided for presented to the user. The first part 120 may therefore comprise a designation of where in a captured scene or where in a view currently presented to the user is focused for presentation to a user. The presentation of the captured visual imagery may be provided by a different apparatus and therefore the visual focus information may be reported by said different apparatus or provided in response to a query by the apparatus 101. In one or more examples, the apparatus 101 also provides for presentation of the captured visual imagery and therefore the apparatus 101 may determine the first part.

Accordingly, based on the above-mentioned information, the apparatus 101 may provide for presentation of the captured spatial audio content to accompany the presentation of the captured visual imagery, the captured spatial audio content presented as spatial audio configured to provide the perception, for the user, of the audio originating from the directions indicated in the captured spatial audio content. The apparatus 101, in one or more examples, provides for presentation of the spatial audio content with a spatial audio focus selectively applied to only a part of the captured spatial audio content that is captured from a different part of the scene to the first part 120. In this example, the spatial audio focus is applied to the audio from a second part 121 of the captured scene 104 different to the first part 120. It will be appreciated that the spatial audio focus may be applied to one or more second parts 121, such as second parts that may be spatially separate from each other in the captured scene 104.

The selection of the second part 121 may be further based on audio focus information. The audio focus information comprises information indicative of at least one part of the captured scene 104, as represented in the captured spatial audio content, on which the captured spatial audio content could be focused. The audio focus information may provide a plurality of candidate parts of the scene. The audio focus information may simply identify the parts of the scene as represented in the captured spatial audio content from which audio was received, i.e. from directions 117, 118, 119. In one or more examples, the audio focus information may be received from the audio focus determination apparatus 107. The audio focus determination apparatus 107 may perform computer implemented audio analysis of the captured spatial audio content to identify the audio sources 110, 112, 116 and may suggest one or more of them as being most relevant relative to predetermined criteria. The audio focus determination apparatus 107 may base the determination of the part(s) of the scene 104 on which the captured spatial audio content should be focused based on visual analysis of the captured visual imagery. Thus, in this example, the audio focus determination apparatus 107 may determine that the audio 114 is the father calling the dog, but the dog is not in the field of view. Accordingly, the at least one part of the scene 104 on which the captured spatial audio content should be focused may be selected as the part corresponding to the dog 112 in direction 118. In one or more examples, the audio focus determination apparatus 107 may comprise part of the apparatus 101 and therefore the apparatus 101 may perform the determination of the part of the scene 104 on which the captured spatial audio content should be focused.

The audio focus information may be specific to the user to which the captured visual imagery and captured spatial audio content is intended for presentation. Thus, the apparatus 101 may be provided with information identifying the user to which the captured visual imagery and captured spatial audio content is to be presented and may therefore customize the presentation of the captured visual imagery and captured spatial audio content to the user. In other examples, the apparatus 101 may be provided with parameters related to historical viewing of at least different audio-visual content, which may be used as a basis for identifying a part of the spatial audio content to focus on for current audio-visual content.

Accordingly, based on the above-mentioned information, the apparatus 101 may provide for presentation of the captured spatial audio content to accompany the presentation of the captured visual imagery, the captured spatial audio content presented as spatial audio configured to provide the perception, for the user, of the audio originating from the directions indicated in the captured spatial audio content. The apparatus 101, in one or more examples, provides for presentation of the spatial audio content with a spatial audio focus selectively applied to only a part of the captured spatial audio content, based on the audio focus information. In this example, the spatial audio focus is applied to the audio from a second part 121 of the captured scene 104 different to the first part 120. It will be appreciated that the spatial audio focus may be applied to one or more second parts 121, such as second parts that may be spatially separate from each other in the captured scene 104.

In one or more examples, the audio focus information may comprise one or more parts of the captured scene 104 and may exclude the first part 120. In one or more other examples, the audio focus information may suggest a plurality of parts of the captured scene 104 and the apparatus 101 may select one of them based at least on a criterion that it differs in location or direction from the first part 120.

In this example, the spatial audio focus comprises an audio-modifying effect to increase the audibility of the audio having a direction 118 corresponding to the second part relative to the audio from elsewhere in the captured scene 104, such as from directions 117, 119. This increase in audibility may be achieved by any one of (i) providing a greater relative volume gain to the audio from direction 118;

(ii) attenuating the volume of the audio from elsewhere in the captured scene 102; (iii) increasing a perceived spatial width of the spatial audio from direction 118 or a combination of two or more of (i), (ii) and (iii). Thus, in one or more examples, the audio-modifying effect, with the audio focus on the second part, increases the audibility of the audio from the second part relative to other audio that is not from the first part.

Accordingly, in one or more examples, providing a different audio focus to the visual focus may assist in user understanding of the captured visual imagery and spatial audio content. In this example, the second part 121 is non-overlapping with the first part 120 but, in other examples, it may be. In one or more examples, the second part 121 is selected to be outside the field of view 113. In other examples, both the first and second part may be within the field of view 113. For example, the presentation of the captured visual imagery may be focused on the son 111. As an example, the visual imagery may have a narrow depth of field and therefore the son 111, being closer to the content capture device may be in optical focus while the father 110 may be out of optical focus. Accordingly, the visual focus information may indicate the first part as corresponding to the part of the captured scene in which the son 111 is present. The audio focus information may designate the audio 114 as the part of the captured scene to which the audio-modifying effect should be applied and therefore the visual imagery may be focused on the son 111 while the spatial audio content may be focused on the audio 114 from the father 110.

As mentioned above, the apparatus 101 may provide for determination of the audio focus information. The audio focus information may be based on one or both of computer implemented audio analysis of the captured spatial audio content and computer implemented visual analysis of the captured visual imagery based on predetermined criteria. The apparatus 101 may be configured such that selection of the first part for visual focus may drive the selection of a different part for the audio focus information. The audio focus information may be determined by neural network processing or other machine learning technique. The neural network processing or machine learning technique may be trained on, for example, other spatial audio content presented to the user (or to many different users). The audio focus information may be selected, for example, based on contextual significance related to the visual focus information. Thus, the selection of the second part 121 may be relevant and, in some examples, user specific.

In one or more examples, the audio focus information may be based on a user-selection, from the user, of the at least one part of the scene 104 as captured. Thus, the user viewing the captured spatial audio and visual imagery content may manually select the second part 121 and, optionally, the first part 120.

In one or more examples, the audio focus information may be based on a user-set profile setting indicative of audio preferences, such as preferred sounds, such as types of music or birdsong, or specific audio sources, such as family members or animals that may appear in the visual imagery.

In one or more examples, the audio focus information may be based on historical data associated with the user to which the apparatus 101 provides the content for presentation. The historical data may be indicative of one or more user-selections, by the user, of sources of audio in other content they have consumed. Accordingly, features that are audibly present in the captured spatial audio content or visually appear in the captured visual content may be identified by visual and/or audio analysis based on them also appearing in different, captured visual and audio content that has been previously presented to the user and, optionally, manually selected by the user.

In one or more examples, the audio focus information may be based on location specific data comprising historical location data associated with the user and indicative of common features that are audibly present in the captured spatial audio content or visually appear in the captured visual content as well as in different, captured visual and audio content that has been previously presented to the user at a location corresponding to a determined location of the scene. The corresponding location may be a corresponding geographic location or a corresponding area, building or room, such as a park (possibly parks having geographically different locations), a library (possibly libraries having geographically different locations) or a living room or kitchen (possibly in a different house).

In one or more examples, the audio focus information may be based on time specific data time specific data comprising historical data indicative of audio that is common to the captured spatial audio content as well as in different, captured visual and audio content captured at a related time period, comprising a recent time period or a corresponding time of day or year. Thus, as an example, spatial audio content present in a video captured at Christmas last year may be identified in content captured at Christmas in the current year and may be identified for application of the audio-modifying effect.

Thus, to summarise, the audio focus information may be: based on information identifying the user to which the presentation of the spatial audio and visual imagery is intended and customized based on known information about the user to provide a bespoke experience for the user when they consume the captured visual imagery and captured spatial audio content.

In one or more examples, the apparatus has means, in the provision for presentation of the captured spatial audio content, configured to mix the captured spatial audio content with different captured spatial audio content that is related to the captured spatial audio content based on one or both of the time it was captured and the location at which it was captured, the spatial audio focus applied to a second part of the mixed, different captured spatial audio content. Thus the captured spatial audio content received by the apparatus 101 may comprise content from the scene but also content from a different scene that is determined to correspond to the scene by one of user-preference, time or location.

The captured spatial audio content and corresponding visual imagery may be presented live or may be recorded and then presented at a later time.

In one or more examples, the captured visual imagery and captured spatial audio content is provided for presentation live and the application of the spatial audio focus by the apparatus 101 provides for sending of feedback signalling to the content capture device 102. Thus, a consumer of the visual imagery and spatial audio content may control how the content is captured by the device 102. The feedback signalling may be configured to provide for application of the audio-modifying effect by the content capture device 102. Thus, the apparatus 101 may provide for control of the application of spatial audio gain at the content capture device 102 or may control the direction in which microphones are pointed. This may provide for a reduction in the data transmitted to the store 108 by the content capture device 102 as the captured spatial audio content may be processed or captured, at the content capture device 102, as desired by the user. Thus, capturing the spatial audio content with the appropriate gain settings may provide for application of the audio-modifying effect. A feedback control channel 122 may provide for said control. This communication channel 122 may be provided directly or via a network.

In other examples, whether for presentation live or pre-recorded, the captured visual imagery may be captured in an optically refocusable format that enables a change in the optical focus in terms of one or both of the position and depth of the depth of field of the visual imagery in accordance with the visual focus information. It will be appreciated that optical focus, in the presentation of the visual imagery, comprises the sharpness of the visual imagery with the depth of objects appearing in the visual imagery relative to a point of view from which the captured visual imagery was captured or rendered.

The content capture device, as will be known to those skilled in refocusable image formats may comprise a light-field camera. In other examples, the captured visual imagery may be associated with scene depth information such that the depth of objects appearing in the visual imagery in the captured visual imagery is known and therefore a simulated optical focus, in terms of sharpness and the depth of the depth of field of the visual imagery may be applied by way of image processing on captured visual imagery. In further embodiments, a refocusable image format can be based on several separate image captures at different focusing distances and/or depths of field. Such methods may be particularly suitable for still image capture rather than video capture.

As briefly mentioned above, the apparatus 101 may, based on the captured visual imagery of the scene 104 from store 108, be configured to provide for presentation of the captured visual imagery with the first part 120 of the captured scene 104 defined in the visual focus information focused for presentation to the user. The first part 120 of the captured scene 104 may be considered focused for presentation to the user in terms of the first part 120 comprising a spatial sub-section of the captured scene 104 that is within a view 113 provided for presentation. In one or more examples, the first part 120 comprises a spatial sub-section of the field of view 113 provided for presentation that is in optical focus relative to a remainder of the visual imagery in the field of view 113 provided for display that is less in optical focus. Accordingly, the apparatus 101 may provide for control of the optical focus of the visual imagery using a refocusable image format or may provide for the application of an optical focus effect to provide a similar perceived visual effect.

The captured visual imagery may be of a plurality of different forms. For example, the captured visual imagery of the scene 104 comprises one of:
a) a still visual image of the scene;
b) video imagery of the scene;
c) virtual reality imagery of the scene having a spatial extent greater than a spatial extent 113 presentable to the user at any one time.

During the presentation of the captured visual imagery and captured spatial audio content, the apparatus 101 may provide for changing or updating of to which audio the audio focus is applied. This change or updating may be in response to a change in the visual focus information or a change in the captured spatial audio content itself. For example, the audio source previously focused on may have left the scene 104 in the case of video imagery and may therefore no longer be present in the captured spatial audio content. An audio source, on the other hand, may become inactive over time.

In the case of pre-recorded content, it can furthermore be known whether a transition of an audio source from an active state to an inactive state is a permanent change. In case of live capture, it generally cannot be known whether for example a talker (or other audio source) remains silent after their current utterance is completed and the talker becomes inactive. For such reasons, the updating of the audio focus target may include a time delay or hysteresis.

In one or more examples, the apparatus 101 may be configured: based on (i) a change in the visual focus information to define at least a third part of the captured scene 104, different to the first part 120, on which the captured visual imagery provided for presentation to a user should be focused and (ii) the on-going presentation of the captured spatial audio content to accompany the presentation of the captured visual imagery; provide for a change in the selectively applied spatial audio focus to audio captured from a fourth part of the scene different to the second part 121.

As an example of the above, the son 111 may suddenly react to something. The third part may, in this example, therefore comprise the part of the visual imagery showing the son 111. The visual imagery provided for presentation to the user may then be modified to bring the son 111 into optical focus while the father 110 may become slightly out of optical focus. The change in visual focus information may, in one or more examples trigger the apparatus 101 to provide for audio analysis of the captured spatial audio content, which may identify the occurrence of a loud sound from source 116, that the son 111 may have reacted to. The audio focus may therefore be changed to apply to the fourth part which may comprise the part of the captured scene 104 containing the further audio source 116. In one or more examples, the part of the scene comprising the further audio source 116 may be added to the existing audio focus applied to the dog 112 in the second part 121 rather than replacing it. Accordingly, the audio-modifying effect may be applied to both the second part 121 containing the audio from the dog 112 and the fourth part containing the audio from the audio source 116.

As an example of how the apparatus 101 may be configured to react to a change in the captured spatial audio content, the apparatus 101 may, based on (i) computer implemented audio analysis of the captured spatial audio content being indicative of one or both of a change in sources of audio 114, 115, 116 in the scene and a change in the position of sources of audio 114, 115, 116 in the scene 104 and (ii) the on-going presentation of the captured spatial audio content to accompany the presentation of the captured visual imagery; provide for a change in the selectively applied spatial audio focus to audio captured from a fourth part of the scene different to the first part 120 and the second part 121. As in the previous example, the fourth part may comprise a part including audio source 116. The audio analysis, in one or more examples, may be performed by the apparatus 101. The audio analysis may comprise monitoring of the presence or absence of audio content from different parts of the captured audio from the scene 104 based on the captured spatial audio to identify parts of the scene that include audio. The audio analysis may include the tracking of movement of the audio through the audio of the captured scene 104 to update the position of the part to which the audio focus is applied. The audio analysis may include audio recognition of the objects or occurrences that may have caused the audio, which may be categorised or ranked for their relevance, such as against objects identified as present in the captured visual imagery.

The audio analysis provided for by the apparatus 101 may be applied to live captured spatial audio content or pre-recorded captured spatial audio content. In the case of live content, only current and/or past content can be subject to audio analysis. However, for pre-recorded content the audio analysis may be applied to captured spatial audio content ahead of a current playback time point that may be provided for presentation to a user.

Thus, in one or more examples in which the captured visual content and captured spatial audio content is provided for presentation live, the apparatus 101 may comprise means configured to determine one or more candidate second parts of the captured scene 104, in terms of the direction information provided with the captured spatial audio content. The determination of the one or more candidate second parts may be based on computer-implemented analysis of the captured spatial audio content as it is captured, the apparatus 101 configured to select one or more of said candidate second parts for application of said spatial audio focus.

Thus, in one or more examples in which the captured visual content and captured spatial audio content is pre-recorded content, the apparatus 101 may comprise means configured to determine one or more candidate second parts of the captured scene 104, in terms of the direction information provided with the captured spatial audio content. The determination of the one or more candidate second parts may be based on computer-implemented analysis of the captured spatial audio content prior, at least in part, to the provision of the captured spatial audio content for presentation, the apparatus 101 configured to select one or more of said candidate second parts for application of said spatial audio focus.

In the above examples, changes in the parts of the captured scene, in terms of the captured visual imagery on which the visual focus is provided for presentation to a user and changes in the parts of the captured scene audio, in terms of the captured spatial audio content, to which the audio focus is applied may be provided for gradually to avoid abrupt changes in focus. Thus, the changes may be provided over a predetermined transition time period in which the increased audibility of the at least one second part is reduced while the audibility of the new second part is increased.

The application of the audio focus may have further beneficial application when browsing multiple instances of audio-visual content comprising the captured visual imagery and captured spatial audio content.

Thus, in one or more examples, the audio of the captured spatial audio provided with the spatial audio focus is further presented with a user-selectable link. A visual graphic or a sound or other feedback may be provided to indicate that the audio provided with the focus is a user-selectable link. The apparatus 101 has means configured, on user selection of the link, to provide for presentation of different audio-visual content comprising different captured visual imagery and corresponding, different, captured visual imagery. The different captured visual imagery and corresponding captured visual imagery may have one or more of (i) captured spatial audio content that is determined to be audibly similar based on computer implemented audio analysis in comparison to the audio provided with the spatial audio focus and (ii) captured visual imagery that is determined to contain imagery of an audio source that is related to a determined source of the audio provided with the spatial audio focus.

Thus, the apparatus 101 may be configured to provide for linking to different audio-visual content based on analysis of the audio in focus and the user-selection of the audio in focus by the user. The user-selection may comprise a predetermined gesture in the direction 118 of the audio in focus or some other user-input.

If the different audio-visual content has similar captured spatial audio content, the audio that is common or similar to both audio-visual content may be provided with an audio focus when the different audio-visual content is provided for presentation to the user. If the different audio-visual content has similar visual imagery related to the identity of the source of the audio having said focus, the part of the visual imagery, in the different audio-visual content, showing said source may be provided for presentation with the visual focus.

Figure 2:
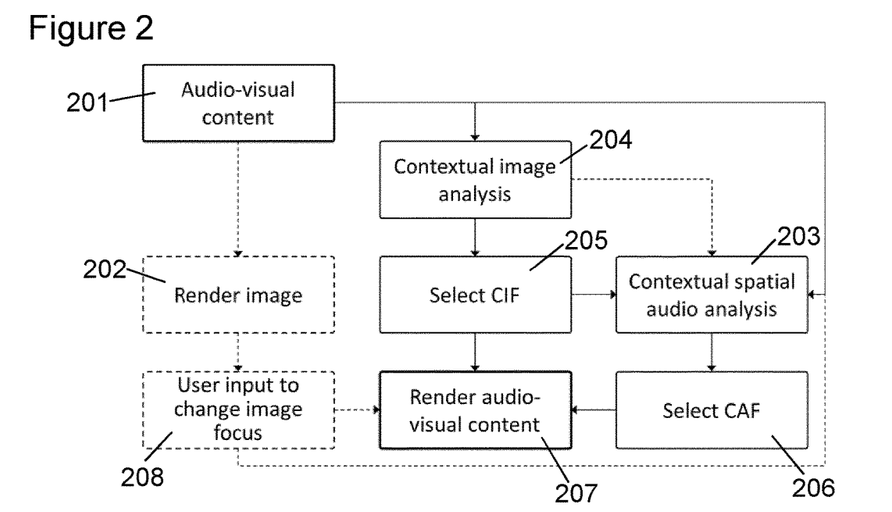
FIG. 2 shows an example block diagram of the apparatus.

Example FIG. 2 shows a block diagram illustrating an example arrangement of functional blocks of the apparatus 101.

The captured visual imagery and captured spatial audio content may be provided to the apparatus at block 201. The captured visual imagery may be provided for rendering at block 202 by the apparatus 101 or to a different apparatus for rendering. The captured spatial audio content may be passed to a contextual spatial audio analysis block 203 for identifying one or more second parts to provide for generation of the audio focus information. The block 203 may perform computer implemented visual and/or audio analysis to identify audio from different directions in the captured scene 104 and thus from different parts of the scene that are contextually relevant to the user based on one or more predetermined criteria. Block 204 comprises a contextual image analysis block representing the performance of computer implemented image analysis on at least the visual imagery to determine the first part on which the presentation of the visual imagery is focused. Accordingly, block 204, like block 203 is configured to identify contextually relevant parts of the captured content for presentation with a focus comprising an imagery enhancing effect and an audio-modifying effect. Block 205 shows the selection of the first part and thus the generation of the visual focus information. The contextual spatial audio analysis block 203 may receive the visual focus information so that the second part 121 identified thereby is different to the first part 120. The contextual spatial audio analysis block 203 may perform computer implemented analysis (with or without user input) of the captured spatial audio based on one or more of the location, time, user-specific criteria mentioned above and provide the audio focus information to block 206. Block 206 shows the selection of the one or more second parts 121 based on the audio focus information from block 203. Block 207 shows the selected first part for visual imagery focus and the selected spatial audio content focus provided for rendering of the captured visual imagery and captured spatial audio content with the relevant visual focus effect and audio-modifying effect applied to the determined first and second parts 120, 121. Block 208 shows possible user-selection of a desired visual focus. The change in the first part 120 by virtue of such user-selection may be provided to block 207 for rendering of the visual imagery with the new focus and also to block 203 for triggering the possible determination and selection, by blocks 203 and 206, of a different second part 121 based on the change in the first part 120.

Figure 3:
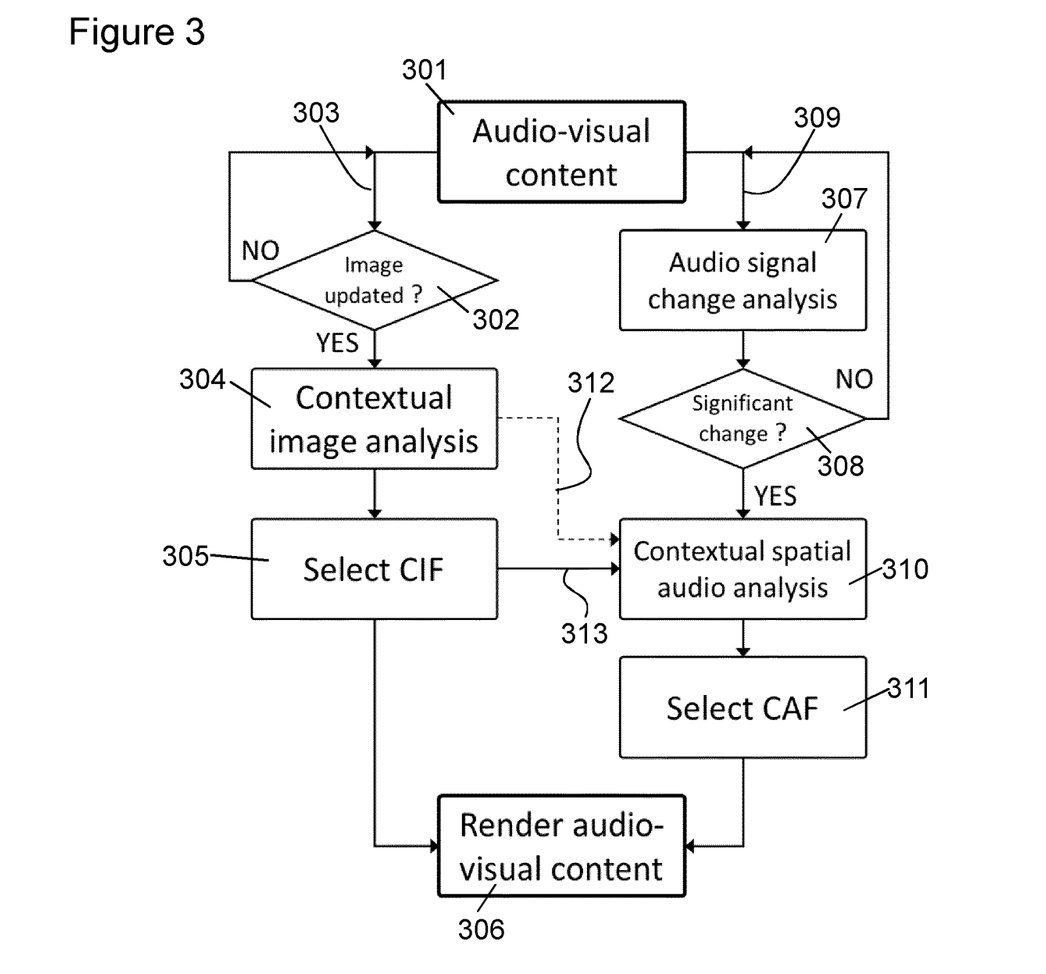
FIG. 3 shows a flowchart showing an example operation flow of the apparatus.

Example FIG. 3 shows a flowchart illustrating the provision of the audio-visual content for presentation at step 301 and the determination of changes in the application of the visual imagery focus or the spatial audio focus. Step 302 illustrates determination of any changes in the captured visual imagery as provided for presentation. If no changes have occurred or the changes are below a threshold change, the flow returns to point 303. If visual imagery changes have occurred, the flow proceeds to step 304 in which contextual image analysis is performed to determine the first part 120 on which to provide the focus in the presentation of the visual imagery to a user. Step 305 shows the selection of the visual imagery focus and step 306 the rendering of the audio-visual content with the visual focus.

The step 307 shows the apparatus 101 being configured to perform audio analysis on the captured spatial audio content to identify any changes in the audio content. Step 308 illustrates determination of any changes in the captured spatial audio content that exceed a predetermined "significant change" threshold. The threshold may be constant or may be adapted at least partly based on the content. If no changes have occurred or the changes are below a threshold change, the flow returns to point 309. If changes in the captured spatial audio have occurred, the flow proceeds to step 310 in which contextual spatial audio analysis is performed to determine the one or more second part 121 on which to provide the focus in the presentation of the captured spatial audio content to a user. Step 311 shows the selection of the spatial audio focus and step 306 the rendering of the audio-visual content with the selected spatial audio focus. As shown by arrows 312 and 313 a change in the visual imagery focus may provide for initiation of the step 310 to perform contextual spatial audio analysis to determine the one or more second parts 121 on which to provide the focus in the presentation of the captured spatial audio content to a user.

Figure 4:
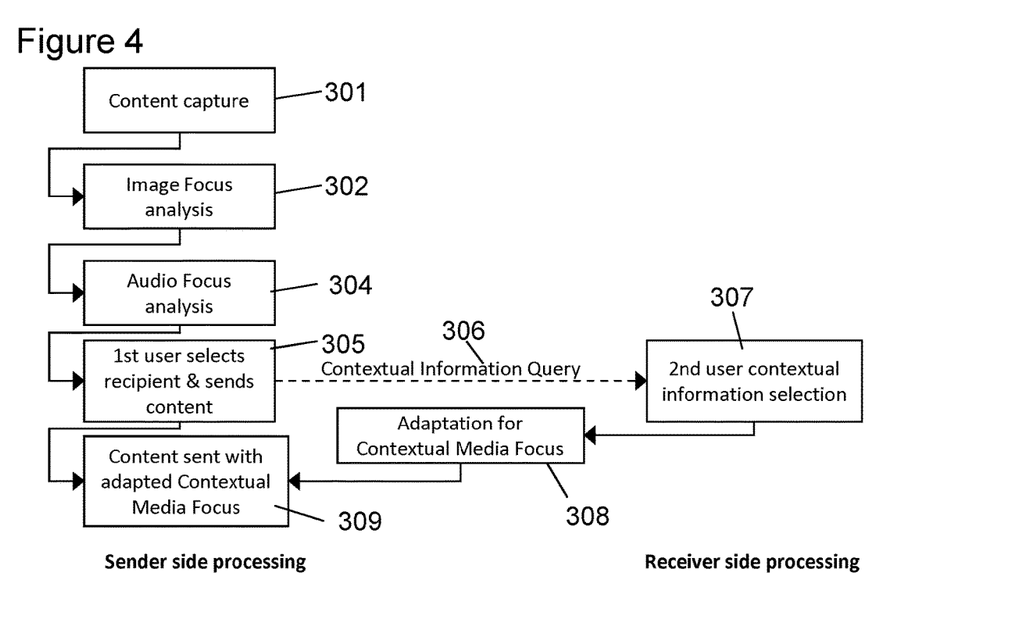
FIG. 4 shows a flowchart showing a further example operation flow of the apparatus.
Figure 5:
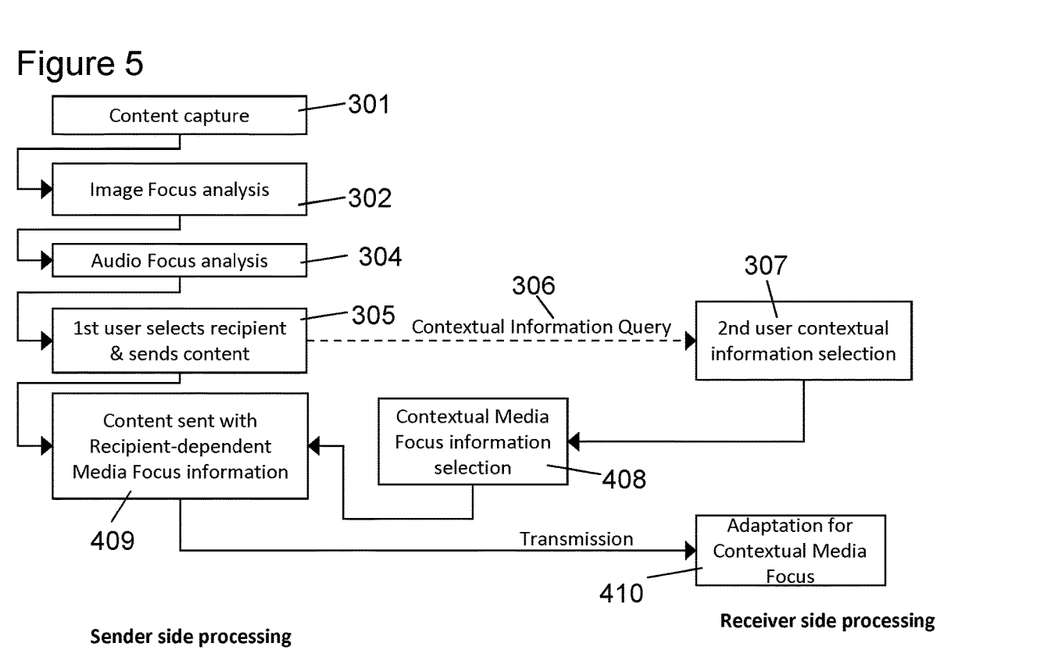
FIG. 5 shows a flowchart showing a still further example operation flow of the apparatus.

FIGS. 4 and 5 show two examples of the capture of captured spatial audio content and corresponding captured visual imagery by a first user who sends the content to a different user, wherein the visual focus and/or spatial audio focus is determined based on the user to whom the content is presented.

With reference to FIG. 4, step 401 shows the spatial audio content and the corresponding visual imagery being captured by a first user. Step 302 shows the apparatus of the first user determining the visual imagery focus for use in presentation of the content to the first user. Step 304 shows the apparatus of the first user determining the audio focus for the first user for use in presentation of the content to the first user. Step 305 shows the first user selecting an apparatus of a second user to which to send the captured content. As mentioned above, the visual and/or audio focus may be specific to the user viewing the content.

The first user apparatus is shown to send a contextual information query at 306, which may include the content or information about the objects/audio sources present in the content. At step 307, the second user apparatus makes a selection of where the visual focus and spatial audio focus should be for presentation to the second user. Step 308 shows the information about the selected visual focus and spatial audio focus being applied to the content by one or both of the first user apparatus and second user apparatus. Step 309 shows the first user apparatus having sent the captured spatial audio content and corresponding captured visual imagery to the second user apparatus with the selected visual focus and selected spatial audio focus of the second user. Accordingly, the second user receives the content with the visual focus and audio focus tailored to their requirements.

FIG. 5 shows an alternative embodiment. Steps 301 to 307 are substantially the same and therefore the same reference numerals have been used. However, after step 307, the method of this example proceeds to step 408 in which information about the visual focus and spatial audio focus selection(s) made by the second user apparatus is communicated to the first user apparatus. Step 409 shows the first user apparatus sending the content with "recipient-dependent Media Focus information" that provides an instruction to the second user apparatus to render the content with the selected visual focus and selected spatial audio focus sent in step 306. Step 410 shows the second user apparatus rendering the content with the instructed visual focus and spatial audio focus.

Figure 6:
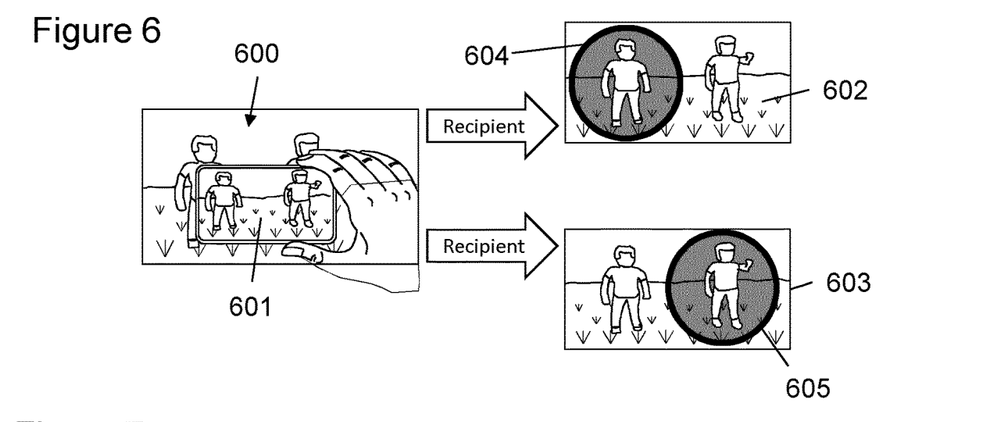
FIG. 6 shows a flowchart showing an example of the apparatus in use.

FIG. 6 shows the practical result of the concept illustrated in FIGS. 4 and 5. FIG. 6 shows a scene 600 captured by a first user apparatus comprising smart phone 601. The first user apparatus then sends the captured content to two different recipients for presentation at 602 and 603. As the visual focus and the spatial audio focus are, in one or more examples, specific to the user to which the content is presented, the content may be displayed differently at each of the recipient's apparatuses. Accordingly, the apparatus 601 may perform either of the processes illustrated in FIGS. 4 and 5. As an example, the content is presented to the first recipient with the audio focus, shown by circle 604, on the audio from a first person appearing in the content. However, the content presented to the second recipient has an audio focus shown by circle 605 focused on the audio from a second person appearing in the content.

Accordingly, in one or more examples, the apparatus may be configured to provide for sending of the captured spatial audio and corresponding visual imagery to a second-user-apparatus based on context selection information, comprising where in the content the visual and or spatial audio focus should be applied, the context selection information received from the second-user-apparatus in response to at least information about the captured content sent to the second-user-apparatus from the apparatus. Thus, the captured content of the scene may then be provided for presentation to the second user by the second-user-apparatus with a visual focus and/or spatial audio focus relevant to the second user.

Figure 7:
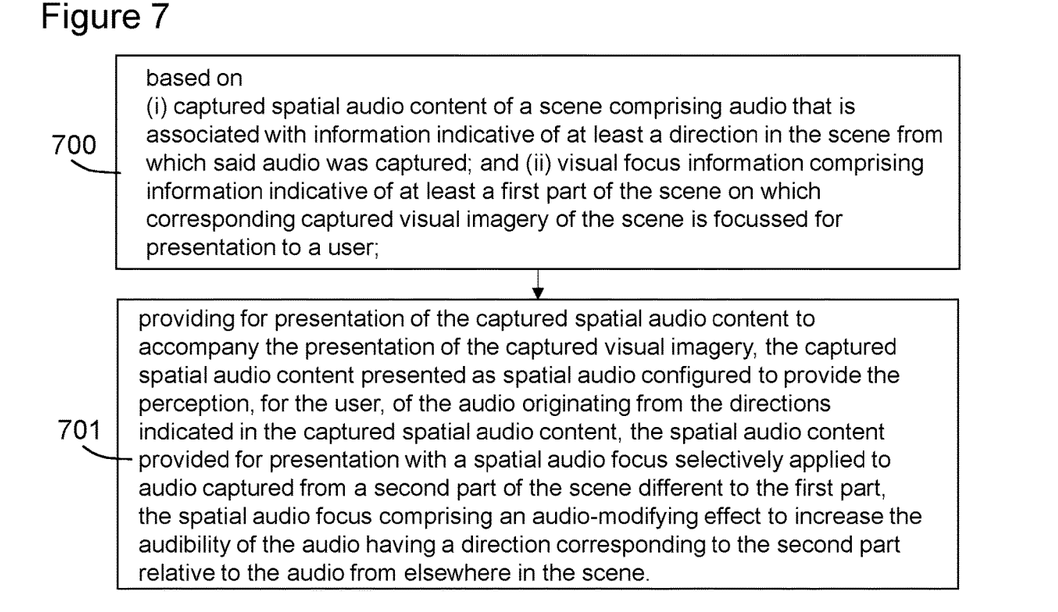
FIG. 7 shows a flowchart illustrating an example method.

FIG. 7 shows a flow diagram illustrating the steps of, based on 700
  (i) captured spatial audio content of a scene comprising audio that is associated with information indicative of at least a direction in the scene from which said audio was captured; and
  (ii) visual focus information comprising information indicative of at least a first part of the scene on which corresponding captured visual imagery of the scene is focused for presentation to a user;
providing 701 for presentation of the captured spatial audio content to accompany the presentation of the captured visual imagery, the captured spatial audio content presented as spatial audio configured to provide the perception, for the user, of the audio originating from the directions indicated in the captured spatial audio content, the spatial audio content provided for presentation with a spatial audio focus selectively applied to audio captured from a second part of the scene different to the first part, the spatial audio focus comprising an audio-modifying effect to increase the audibility of the audio having a direction corresponding to the second part relative to the audio from elsewhere in the scene.

Figure 8:
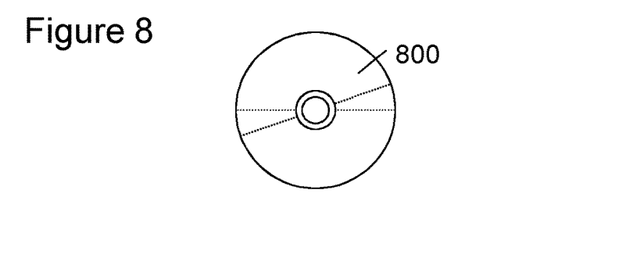
FIG. 8 shows a computer readable medium.

FIG. 8 illustrates schematically a computer/processor readable medium 800 providing a program according to an example. In this example, the computer/processor readable medium is a disc such as a digital versatile disc (DVD) or a compact disc (CD). In some examples, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

User inputs may be gestures which comprise one or more of a tap, a swipe, a slide, a press, a hold, a rotate gesture, a static hover gesture proximal to the user interface of the device, a moving hover gesture proximal to the device, bending at least part of the device, squeezing at least part of the device, a multi-finger gesture, tilting the device, or flipping a control device. Further the gestures may be any free space user gesture using the user's body, such as their arms, or a stylus or other element suitable for performing free space user gestures.

The apparatus shown in the above examples may be a portable electronic device, a laptop computer, a mobile phone, a Smartphone, a tablet computer, a personal digital assistant, a digital camera, a smartwatch, smart eyewear, a pen based computer, a non-portable electronic device, a desktop computer, a monitor, a smart TV, a server, a wearable apparatus, a virtual reality apparatus, or a module/circuitry for one or more of the same.

Any mentioned apparatus and/or other features of particular mentioned apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
   at least one processor; and
   at least one non-transitory memory including computer program code, the at least one memory and the computer program code configured to, with the at least one processor, cause the apparatus to perform at least the following:
   based on
       captured spatial audio content of a scene comprising audio that is associated with information indicative of at least one direction in the scene from which said audio was captured, and
       visual focus information comprising information indicative of at least a first part of the scene on which corresponding captured visual content of the scene is focused for presentation to a user, provide for presentation of the captured spatial audio content to accompany the presentation of the captured visual content, the captured spatial audio content presented as spatial audio configured to provide a perception, for the user, of the audio originating from the at least one direction indicated in the captured spatial audio content, the captured spatial audio content provided for presentation with a spatial audio focus selectively applied to audio captured from a second part of the scene different to the first part, the spatial audio focus comprising an audio-modifying effect to increase an audibility of the audio having a direction corresponding to the second part relative to the audio from elsewhere in the scene.

2. The apparatus of claim 1, wherein the second part is selected based on audio focus information that is specific to the user to which the captured visual content and captured spatial audio content is intended for presentation and the apparatus is configured to determine the audio focus information based on at least one of:
- a user-selection, from the user, of the second part of the scene;
- a user-set profile setting indicative of one or more of audio or sources of audio the user prefers;
- historical data associated with the user and indicative of one or more user-selections, from the user, of common features that are audibly present in the captured spatial audio content or visually appear in the captured visual content as well as in different, captured visual and audio content that has been previously presented to the user and selected by the user;
- historical location data associated with the user and indicative of common features that are audibly present in the captured spatial audio content or visually appear in the captured visual content as well as in different, captured visual and audio content that has been previously presented to the user at a location corresponding to a determined location of the scene; or
- time specific data comprising historical data indicative of audio that is common to the captured spatial audio content as well as in different, captured visual and audio content captured at a related time period, comprising a recent time period or a corresponding time of day or year.

3. The apparatus of claim 1, wherein the first part of the scene comprises at least one of:
- a whole spatial extent of the captured visual content that is currently provided for presentation;
- a sub-section of the whole spatial extent of the captured visual content that is currently provided for presentation; or
- a part of the captured visual content that is currently provided for presentation and has been selected by the user.

4. The apparatus of claim 1, wherein the captured visual content and the captured spatial audio content is provided for presentation live and the providing of the captured spatial audio content for presentation with the spatial audio focus selectively applied provides for sending of feedback signalling to a content capture device capturing the captured spatial audio content, the feedback signalling configured to provide for application of the audio-modifying effect with the content capture device.

5. The apparatus of claim 1, wherein the captured visual content and the captured spatial audio content is pre-recorded captured content, the captured visual content captured in an optical refocusable format that enables a change in an optical focus in terms of one or both of a position or depth of a depth of field of the captured visual content in accordance with the visual focus information.

6. The apparatus of claim 1, wherein the apparatus, based on the captured visual content of the scene, is configured to provide for presentation of the captured visual content with the first part of the scene defined in the visual focus information focused for presentation to the user.

7. The apparatus of claim 1, wherein the captured visual content of the scene comprises one of:
- a still visual image of the scene;
- video imagery of the scene; or
- virtual reality imagery of the scene having a spatial extent greater than a spatial extent presentable to the user at any one time.

8. The apparatus of claim 4, wherein the apparatus is configured to perform the following:
- based on a change in the visual focus information to define at least a third part of the scene on which the captured visual content provided for presentation to the user should be focused and on-going presentation of the captured spatial audio content to accompany the presentation of the captured visual content,
- provide for a change in the selectively applied spatial audio focus to audio captured from a fourth part of the scene different to the second part.

9. The apparatus of claim 4, wherein the apparatus is configured to perform the following:
- based on analysis of the captured spatial audio content being indicative of one or both of a change in sources of audio in the scene or a change in positions of the sources of audio in the scene and on-going presentation of the captured spatial audio content to accompany the presentation of the captured visual content,
- provide for a change in the selectively applied spatial audio focus to audio captured from a fourth part of the scene different to the first part and the second part.

10. The apparatus of claim 4, wherein the captured visual content and the captured spatial audio content is provided for presentation live and the apparatus is configured to determine one or more candidate second parts of the scene based on computer-implemented analysis of the captured spatial audio content as it is captured, the apparatus configured to select one or more of said one or more candidate second parts for application of said spatial audio focus.

11. The apparatus of claim 5, wherein the captured visual content and the captured spatial audio content is pre-recorded content and the apparatus is configured to determine one or more candidate second parts of the scene based on computer-implemented analysis of the captured spatial audio content prior, at least in part, to the providing of the captured spatial audio content for presentation, the apparatus configured to select one or more of said one or more candidate second parts for application of said spatial audio focus.

12. The apparatus of claim 1, wherein the audio provided with the spatial audio focus is further presented with a user-selectable link, wherein the apparatus is configured, on user selection of the user-selectable link, to provide for presentation of different captured visual content and the corresponding captured visual content, the different captured visual content and the corresponding captured visual content having one or more of captured spatial audio content that is determined to be audibly similar based on audio analysis in comparison to the audio provided with the spatial audio focus or the captured visual content that is determined to contain content of an audio source that is related to a determined source of the audio provided with the spatial audio focus.

13. The apparatus of claim 2, wherein the audio focus information is determined using a neural network based on a plurality of instances of spatial audio content presented to the user.

14. A method comprising:
based on
captured spatial audio content of a scene comprising audio that is associated with information indicative of at least one direction in the scene from which said audio was captured, and
visual focus information comprising information indicative of at least a first part of the scene on which corresponding captured visual content of the scene is focused for presentation to a user,
providing for presentation of the captured spatial audio content to accompany the presentation of the captured visual content, the captured spatial audio content presented as spatial audio configured to provide a perception, for the user, of the audio originating from the at least one direction indicated in the captured spatial audio content, the captured spatial audio content provided for presentation with a spatial audio focus selectively applied to audio captured from a second part of the scene different to the first part, the spatial audio focus comprising an audio-modifying effect to increase an audibility of the audio having a direction corresponding to the second part relative to the audio from elsewhere in the scene.

15. The method of claim 14, wherein the second part is selected based on audio focus information that is specific to the user to which the captured visual content and captured spatial audio content is intended for presentation and the audio focus information is determined based on at least one of:
a user-selection, from the user, of the second part of the scene;
a user-set profile setting indicative of one or more of audio or sources of audio the user prefers;
historical data associated with the user and indicative of one or more user-selections, from the user, of common features that are audibly present in the captured spatial audio content or visually appear in the captured visual content as well as in different, captured visual and audio content that has been previously presented to the user and selected by the user;
historical location data associated with the user and indicative of common features that are audibly present in the captured spatial audio content or visually appear in the captured visual content as well as in different, captured visual and audio content that has been previously presented to the user at a location corresponding to a determined location of the scene; or
time specific data comprising historical data indicative of audio that is common to the captured spatial audio content as well as in different, captured visual and audio content captured at a related time period, comprising a recent time period or a corresponding time of day or year.

16. The method of claim 14, wherein the first part of the scene comprises at least one of:
a whole spatial extent of the captured visual content that is currently provided for presentation;
a sub-section of the whole spatial extent of the captured visual content that is currently provided for presentation; or
a part of the captured visual content that is currently provided for presentation and has been selected by the user.

17. The method of claim 14, wherein the captured visual content and captured spatial audio content is provided for presentation live and the providing of the captured spatial audio content for presentation with the spatial audio focus selectively applied provides for sending of feedback signalling to a content capture device capturing the captured spatial audio content, the feedback signalling configured to provide for application of the audio-modifying effect with the content capture device.

18. The method of claim 14, wherein the captured visual content and the captured spatial audio content is pre-recorded captured content, the captured visual content captured in an optical refocusable format that enables a change in an optical focus in terms of one or both of a position or depth of a depth of field of the captured visual content in accordance with the visual focus information.

19. The method of claim 14, wherein the captured visual content of the scene comprises one of:
a still visual image of the scene;
video imagery of the scene; or
virtual reality imagery of the scene having a spatial extent greater than a spatial extent presentable to the user at any one time.

20. A non-transitory computer readable medium comprising program instructions stored thereon for performing at least the following:
based on
captured spatial audio content of a scene comprising audio that is associated with information indicative of at least one direction in the scene from which said audio was captured, and
visual focus information comprising information indicative of at least a first part of the scene on which corresponding captured visual content of the scene is focused for presentation to a user,
providing for presentation of the captured spatial audio content to accompany the presentation of the captured visual content, the captured spatial audio content presented as spatial audio configured to provide a perception, for the user, of the audio originating from the at least one direction indicated in the captured spatial audio content, the captured spatial audio content provided for presentation with a spatial audio focus selectively applied to audio captured from a second part of the scene different to the first part, the spatial audio focus comprising an audio-modifying effect to increase an audibility of the audio having a direction corresponding to the second part relative to the audio from elsewhere in the scene.

* * * * *